United States Patent [19]

Gibson et al.

[11] 4,120,768

[45] Oct. 17, 1978

[54] PROCESS FOR ELECTROCOATING AQUEOUS COATING COMPOSITION COMPRISING DISPERSION IN WATER OF IONIZABLE SALT OF EPOXY AMINE ADDUCT

[75] Inventors: David Vincent Gibson, North Bayswater; Bruce Leary, Frankston, both of Australia

[73] Assignee: Dulux Australia Ltd., Melbourne,, Australia

[21] Appl. No.: 806,826

[22] Filed: Jun. 15, 1977

Related U.S. Application Data

[60] Division of Ser. No. 651,780, Jan. 23, 1976, Pat. No. 4,064,990, which is a continuation of Ser. No. 471,954, May 21, 1974, abandoned.

[30] Foreign Application Priority Data

Jun. 4, 1973 [AU] Australia .............................. 3548/73

[51] Int. Cl.$^2$ ............................................. C25D 13/06
[52] U.S. Cl. ................................................. 204/181 C
[58] Field of Search ..................................... 204/181 C

[56] References Cited

U.S. PATENT DOCUMENTS

| 3,617,458 | 11/1971 | Brockman | 204/181 C |
| 3,869,366 | 3/1975 | Suzuki et al. | 204/181 C |

FOREIGN PATENT DOCUMENTS

| 1,129,005 | 10/1968 | United Kingdom | 204/181 C |
| 1,307,585 | 2/1973 | United Kingdom | 204/181 C |

*Primary Examiner*—Howard S. Williams
*Attorney, Agent, or Firm*—Cushman, Darby & Cushman

[57] ABSTRACT

Aqueous coating compositions comprising ionizable salts of specific epoxy-amine adducts and acids of $pK_a$ value 1.5 – 6.0 are disclosed. The coatings are particularly useful in a cathodic electrodeposition process.

4 Claims, No Drawings

PROCESS FOR ELECTROCOATING AQUEOUS COATING COMPOSITION COMPRISING DISPERSION IN WATER OF IONIZABLE SALT OF EPOXY AMINE ADDUCT

This is a division of application Ser. No. 651,780 filed Jan. 23, 1976 now U.S. Pat. No. 4,064,990 which in turn is a continuation of Ser. No. 471,954 filed May 21, 1974, now abandoned.

This invention relates to aqueous coating compositions and in particular to such compositions which are suitable for use in a process of cathodic electrodeposition.

The coating of electrically conductive substrates by electrodeposition is an important industrial process. In this process, a conductive article is immersed as one electrode in a coating composition comprising an aqueous dispersion of film-forming polymer and an electric current passed between the article and a counter-electrode in electrical contact with the aqueous dispersion, until a desired coating is produced on the article. At the present time, it is usual for the article which is to be coated to be made the anode in the electrical circuit, the counter-electrode being the cathode. The film-forming polymer, which is also commonly referred to as the polymeric binder of the coating composition, is typically a polymeric polycarboxylic acid. The carboxyl groups of the acid are at least partially neutralised by base, to provide the concentration of ionisable groups on the resin necessary for satisfactory deposition to occur and to obtain a stable dispersion of resin.

For some purposes there are disadvantages in the use of anodic deposition methods. For example, anodic deposition on ferrous metals tends to discolour the electrodeposited film and phosphate conversion coatings, which are commonly applied to a metal surface before an organic coating composition is deposited thereon, tend to be stripped from the metal under anodic deposition conditions. Hence, it has been proposed that the electrically conducting article be made the cathode of the circuit and the coating compositions cathodically deposited thereon. However, known cathodic deposition processes have been reported to give coatings which exhibit poor colour and unsatisfactory corrosion resistance.

We have now found that the inherent advantages of cathodic electro-deposition can be realised and harmful side-effects avoided by using in the process an aqueous coating composition comprising a dispersion in water of an ionizable salt of an epoxy-amine adduct and an acid together with a cross-linking agent for the adduct, characterised in that the ionizable salt consists of the combination of an acid and an epoxy-amine adduct selected from compounds of the formulae

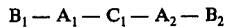  (a)

and

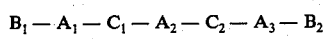  (b)

wherein $A_1$ $A_2$ and $A_3$ are epoxy free residues of essentially straight-chain di-epoxides;

$B_1$ and $B_2$ are residues of primary or secondary mono-amines which have a $pK_b$ value of 4 maximum;

$C_1$ and $C_2$ are residues of diamines or primary mono-amines. and further characterised in that:

(1) the acid shall have a $pK_a$ value of from 1.5 to 6.0 and if it is a carboxylic acid it shall contain not more than two, preferably not more than one carboxyl group, (2) at least 40% and preferably 50 – 60% of the amine groups must be reacted with the acid to form an amine salt, and (3) the epoxy-amine adduct shall have a molecular weight of 1500 – 7000.

The nature and method of preparation of epoxy compounds and resins and the general chemistry of their conversion to amine adducts is well known and recorded in such standard references as, for example, "The Chemistry of Organic Film-Formers" by D. H. Solomon (John Wiley and Sons Inc.). We are concerned, in this invention, with the use in amine adduct form, of epoxy compounds which have an essentially straight chain structure and which contain two epoxide groups capable of reacting with amines. The length of the chain of the epoxide group is of secondary importance and is governed by the requirement that the adduct as a whole shall have a molecular weight of 1500 – 7000. In general, this will mean, bearing in mind the nature of the other constituents of the adduct described hereunder, that the epoxy compound, in order to be of sufficiently high molecular weight, will be selected from that class of materials known as epoxy resins. These materials are essentially linear resins prepared by reacting a polyhydric material such as, for example, a polyhydric polynuclear phenol, e.g. bis-phenol A, with an epichlorhydrin. The linear resin chains are terminated at each end by epoxide groups. Some random branching of the chains is believed to occur but for most purposes resins of this type, which are freely available commercially in a range of molecular weights, are considered to be straight-chain compounds. When such di-epoxides react to form adducts with amines, each reacting oxirane ring opens with the formation of a corresponding hydroxyl group. Thus, it is implicit in our description of the above epoxy-amine adducts that they will be hydroxylated compounds containing at least four hydroxyls per molecule.

Suitable di-epoxides are, for example, bisphenol A/epichlorhydrin condensates with molecular weights of from 400 – 4,000 and which contain two oxirane rings per molecule.

It is not essential to select a single epoxy compound for the preparation of the adduct and a mixture of di-epoxides may be used satisfactorily. In fact, it is well-known that commercial epoxy compounds frequently contain a mixture of similar but not necessarily identical compounds. Thus, in the above-mentioned formula (a), for example, $A_1$ and $A_2$ may be the same or different di-epoxides.

The nature of the amine constituents which provide the residues $C_1$ and $C_2$ is not unduly critical. It will be seen from the above-written formulae (a) and (b) that each amine molecule has become adducted to two separate di-epoxide molecules which, as is well-understood in the art, involves loss of an oxirane ring from each of the epoxides. In order to so-react, the amine must be either a primary mono-amine or a diamine. For convenience we refer hereinunder to constituent C as the "linking amine". Suitable linking amines are, for example, primary mono-amines such as methylamine, ethylamine, n-propylamine, iso-propylamine, n-butyl-amine, phenylamine, benzylamine, ortho-toluidine, metatoluidine, para-toluidine and ethanolamine, and diamines such as ethylene diamine, hexamethylene diamine, n- propyl diamine, ortho-phenylene diamine, meta-phenylene diamine, para-phenylene diamine and triethylene tetramine.

The selection of components $B_1$ and $B_2$, which we refer to hereunder for convenience as the "terminal amines", involves a critical factor not involved in the selection of the linking amine. We have observed that in order to provide stable dispersions of adducts which will have satisfactory electrodeposition characteristics, the terminal amine must have a maximum $pK_b$ value of 4. Combinations of amines may be used and when this is so the $pK_b$ value to be assigned to the mixture is a number average value based on the moles of each amine present in the mixture.

Suitable terminal amines are, for example dimethylamine, diethylamine, di-n-propylamine, di-iso-propylamine, di-n-butylamine, di-iso-butylamine diamylamine and methyl ethylamine.

The purpose of the acid used in conjunction with the epoxy-amine adduct is to provide ionizable groups to enable the materials to be electrodeposited on a conducting substrate. The type of acid has been found to be critical. It has been found that satisfactory polymer dispersions and electrodeposition characteristics cannot be achieved if the acid is a relatively highly ionised acid such as sulphuric, hydrochloric, nitric, trichloroacetic and oxalic acids. In fact, the acid should have a $pK_a$ value of from 1.5 to 6.0. If the acid is a carboxylic acid it shall contain not more than two and preferably not more than one carboxyl group per molecule.

Suitable acids are, for example:
inorganic acids, e.g. orthophosphoric acid;
organic dicarboxylic acids, e.g. succinic acid;
organic monocarboxylic acids, e.g. acetic
formic, lactic and dimethylol propionic acids.

Particularly preferred acids for the stabilisation and electrodeposition processes are phosphoric, lactic, formic, dimethylol propionic and acetic acids.

As will be discussed further hereunder, the acid may also serve a secondary purpose in catalysing the reaction of the epoxy adduct with its cross-linking agent. The cross-linking is usually heat-accelerated and hence relatively volatile acids such as formic acid may be too volatile under these conditions to be effective accelerators for the cross-linking process. Inorganic acids have the added drawback of being difficult to dispose of without polluting the environment.

The cross-linking agent is a compound which will react at normal paint stoving temperatures with the epoxy-amine condensate to give a cross-linked insoluble coating film. Materials which have this property are well-known in the art and include such compositions as phenol-formaldehyde condensates and aminoplast resins. The aminoplast resins are particular adaptable products and include alkylated condensates formed by the reaction of amino-triazines and amino-diazines with formaldehyde. It is known that many amides and amines will condense with formaldehyde in the presence of alcohols to form alkylated aldehyde-amine and aldehyde-amide condensates. For example, urea, thiourea and various substituted ureas will react with aldehydes such as formaldehyde to form alkylated condensates, e.g. methylol ureas. Similarly, melamine and benzoguanimine, for example, will react to form e.g. melamine — aldehyde condensates. When such amino-aldehyde or amidoaldehyde condensates are prepared in the presence of alcohols such as methyl, ethyl, propyl, butyl and isobutyl alcohol, the alcohol enters the condensate molecule as a corresponding ether to form an alkylated condensate. The degree of alkylation has a bearing on the solubility of the condensate but we place no special limitations on this other than than the condensate shall be insoluble in water and compatible with the epoxy-amine polymeric condensate. Our preferred cross-linking agent is a butylated urea-formaldehyde resin.

When desired, the composition may be pigmented by dispersing therein by known means, particulate pigments, other than pigments which will react with the condensate, cross-linking agent or acid. Suitable pigments are, for example, titanium dioxide, iron oxides, carbon black and inert "fillers", e.g. barytes, talc and calcite. A proportion of a corrosion inhibiting pigment e.g. calcium chromate and zinc chromate, may also be used.

One method of preparing a coating composition according to this invention is the following: An epoxy-amine adduct is prepared by mixing a di-epoxide and a secondary (terminal) amine in equimolar proportions and allowing them to co-react. For example a di-epoxide which has an epoxide equivalent of 1000 is mixed with diethylamine, and the reaction allowed to proceed under the stimulus of the exotherm which is generated. A quantity of a primary mono-amine or a diamine (linking amine) is then added in a quantity equivalent to the residual epoxide groups, with which it reacts to form the completed adduct. This addition should be made promptly after the exotherm has passed or some undesirable gellation of the composition may take place. In the above example, a suitable material would be ethylene diamine. The epoxy compound is commonly solid or highly viscous and so we usually prefer to use it in the form of a solution in a water-soluble organic liquid which is inert with respect to the epoxy-amine reaction.

The completed adduct should have a molecular weight of between 1500 and 7000. The use of adducts of molecular weights below this range results in rough paint films, possibly due to severe gassing during electrodeposition while the use of molecular weights higher than we stipulate is associated with films having poor flow.

We have found it preferable to next add the cross-linking agents to the epoxy-amine primary condensate before emulsifying all of these components into water. If a pigmented coating is required, that is a coating wherein pigments have been dispersed to add opacity, colour and/or to modify the mechanical properties of the final paint film, they are most conveniently dispersed in the cross-linking agent before it is added to the epoxy-amine adduct or in a blend of the two. As mentioned above, our preferred cross-linking agent is an etherfied urea-formaldehyde condensate. This should be soluble in the same liquids used to dissolve the epoxide compound in making the adduct.

It is then necessary to add the co-reacting acid to the epoxy-amine adduct and the quantity of acid required must be at least 0.4 mol per mol of amine base present in the epoxy-amine condensate, that is at least 40% of the amine groups present must be reacted. The number of moles of amine base present is, for the purposes of determining the quantity of acid required, considered equal to the multiplication product of the number of moles of epoxy-amine adduct and the number of nitrogen atoms theoretically present in a molecule of the adduct.

The preferred concentration is from 0.5 to 0.6 mol per mol of base. As mentioned above, the acid must have a $pK_a$ value of from 1.5 to 6.0.

Although the invention is not limited by this explanation, it is our belief that the level of salt formation is related to the requirements of emulsion stability when the acidified adduct is stirred vigorously into water, which is the next step in the process. The actual concentration of acid varies somewhat with the nature of the acid selected and although the above limits define broadly the operative concentrations, we prefer to determine the most satisfactory concentration to use for a particular acid and condensate by determining experimentally the acid concentration needed to provide a stable dispersion of adduct in water.

The final stage in the preparation of the coating compositions is therefore, to stir the film-forming ingredients into water, with mechanical agitation.

The method of depositing a coating film on a conductive article by cathodic electrodeposition from an aqueous bath of this type is well known to the art and the compositions we now provide can be applied to a conductive substrate in the conventional manner.

The use of these coating compositions is not limited to their application to a substrate be cathodic electrodeposition since, especially in their pigmented form, they constitute in effect a water-reducible paint, which can be applied in a conventional manner, e.g. by brushing, spraying or rolling.

The invention is illustrated by the following examples in which all parts are given by weight.

EXAMPLE 1

Preparation of a coating composition incorporating an ionizable salt according to the invention where the epoxy amine adduct has the formula

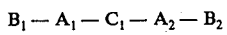

where the various moieties have the meaning described hereinabove; and the evaluation of the coating composition as a metal primer against commercially-available primers.

The following components were used and the method of preparation was as described below.

| A | "Epikote"[1] 1004 resin | 1600.0 parts |
|---|---|---|
|   | "Cellosolve" acetate[2] solvent | 400.0 parts |
|   | Xylene | 133.0 parts |
| B | Diethyl amine | 56.0 parts |
|   | Methanol | 22.0 parts |
| C | Ethylene diamine | 23.0 parts |
| D | Butyl "Cellosolve"[3] solvent | 344.0 parts |

[1]Proprietary name for one member of a commercially available group of resins which are the condensation products of diphenylol propane and epichlorhydrin. "Epikote" is a registered trade mark.
[2,3]Proprietary names for 1-acetyl, 2-ethoxyethane and ethylene glycol monobutyl ether respectively, two of a group of commercially-available glycol-ether solvents. "Cellosolve" is a registered trade mark.

1. Preparation of epoxy-amine adduct.

The components A were loaded into a reaction vessel equipped with a stirrer, reflux condenser and Dean and Stark adapter and the mixture warmed without stirring to about 100° C. to dissolve the resin. Stirring was then commenced, the mixture was heated to 160° C. and maintained there until all water present in the mixture was distilled off. The mixture was then cooled to 55° C., the components B were added, the mixture was stirred until homogenous and then allowed to exotherm. After the exotherm had finishes (about 2 hours during which the temperature of the mixture rose about 8° C.), component C was added and the mixture again allowed to exotherm. After 3 hours during which the temperature rose about 8° C., the mixture was gently heated to reflux (about 125° C.) over a period of an hour and maintained there for a further hour. The resultant epoxy-amine adduct was exposed to the air for 30 minutes and stirred to allow excess amine to escape, and component D was added. The molecular weight of the adduct was 4000.

2. Preparation of coating composition.

A coating composition comprising an ionizable salt according to the invention was prepared as follows:

(a) a millbase was prepared by ball-milling the following components:

| Titanium dioxide | 1000.0 parts |
|---|---|
| Epoxy-amine adduct (as prepared above) | 1250.0 parts |
| Butyl "Cellosolve" solvent | 500.0 parts |

After dispersion, a further 800 parts of butyl "Cellosolve" solvent was added and the millbase filtered.

(b) The following components were blended:

| Millbase (as prepared in (a)) | 400.0 parts |
|---|---|
| Epoxy-amine adduct (as prepared above) | 178.0 parts |
| Commercial butylated urea-formaldehyde resin solution in butyl "Cellosolve" solvent (60.0% non-volatile by weight) | 116.0 parts |
| Butyl "Cellosolve" solvent | 156.0 parts |

The blend was emulsified by stirring in 137 parts of 1M orthophosphoric acid solution and adding it to 3613 parts of water with vigorous stirring. The result was a stable emulsion. Approximately 59% of the amine groups of the adduct had reacted with the phosphoric acid.

A film of the resultant composition was cathodically electrodeposited on to steel panels which had been degreased and phosphated. The panels were washed and allowed to air dry for an hour and finally baked at 175° C. for 20 minutes. They were then coated with a commerically available acrylic appliance enamel and baked. Similar panels were prepared using two commercial alternatives to the cathodic electrodeposition composition, one an epoxy primer and the other an anodic electrodeposition composition. Care was taken to ensure that the film thicknesses of all the primers and top coats were equal (a primer thickness of 10 micron and a top coat thickness of 35 micron was used). Control panels comprised panels which were not primed but which were degreased and phosphated and topcoated.

The panels were subjected to the following series of tests and the results obtained were as shown in the table.

(1) Salt spray test. The panels were scribed and subjected to a 5% NaCl solution at 38° C. for 500 hours according to the method of ASTM B117-64. The deterioration was assessed by scraping the panel and measuring the width of the strip of coating that peeled off. The panels were scribed with a simple straight line scribe and two crossed straight lines.

(2) Humidity test. The panels were exposed to an atmosphere of 100% relative humidity and 38° C. for 1400 hours in a humidity cabinet according to ASTM D2247-68. The extent of blistering of the coatings was evaluated by comparison with the standards in the "Exposure Standards Manual" published by the Federation of Societies for Paint Technology.

(3) Detergent test. The panels were immersed in a 2% detergent solution at 70° C. for 200 hours. Blistering was assessed as in (2).

(4) Alkali resistance test. The panels were scribed with a single straight line and immersed in a 1% solution of sodium orthophosphate at 70° - 75° C. It is a normal commercial requirement that coating materials for equipment such as domestic appliances must withstand 150 hours of this test, but as all three primed coatings withstood the alkali for this period, the tests was continued for a further 200 hours to achieve failure of the coatings at the scribe. The deterioration was assessed as in (1)

|  | Control | Epoxy Primer | Anodic Composition | Cathodic Compositon |
|---|---|---|---|---|
| Salt spray test |  |  |  |  |
| (i) single scribe | 1/2" | <1/16" | 1/8" | <1/16" |
| (ii) cross scribe | 5/8" | <1/16" | 1/4" | 1/4" |
| Humidity test | A few 8F areas | <8F | <8F | no blisters |
| Detergent test | 4 MD | 8F + 2M at edge | Areas of 6F | no blisters |
| Alkali resistance test | 1/4" | Trace failure | 1/16" | 1/16" |

It can be seen from the results recorded above that the performance of the cathodic composition was superior to that of the anodic composition in three out of four tests and equal to it in the fourth. In the case of the epoxy primer, the performance of the cathodic composition was marginally inferior to that of the epoxy primer in tests involving corrosion resistance at a scribe, but appreciably superior to it in tests involving blistering. The cathodic composition was judged to be best overall.

The comparison was repeated with a further sample according to the invention but in which the reaction of the amine groups of the epoxy-amine adduct was limited to about 42% of the available amine groups. the results on testing as described above were essentially the same as for the first sample, but it was observed that the cathodically electrodeposited film was rougher, and hence less satisfactory when the lowel level of reaction was adhered to.

EXAMPLE 2

Preparation of a coating composition incorporating an ionizable salt according to the invention, where the epoxy amine adduct has the formula $$B_1 — A_1 — C_1 — A_2 — C_2 — A_3 — B_2$$

where the various moieties have the meaning hereinabove described.

The following materials were used in the preparation of the epoxy-amine adduct.

| A | "Epikote" 1001 resin | 1500.0 parts |
|---|---|---|
|  | "Cellosolve" acetate solvent | 375.0 parts |
|  | Xylene | 125.0 parts |
| B | n-Butylamine | 73.0 parts |
|  | Methanol | 22.0 parts |
| C | Diethylamine | 73.0 parts |
| D | Butyl "Cellosolve" solvent | 323.0 parts |

The method of preparation of the adduct was identical to that of Example 1 and the resultant adduct had a molecular weight of 3000. The adduct was incorporated into a coating composition in identical fashion to and using the same quantities of materials as in Example 1.

The final product was a stable pigmented aqueous emulsion which when used as a cathodic electrodeposition coating composition, gave results similar to those recorded for the composition prepared in Example 1.

EXAMPLE 3

Attempted preparation of a coating composition incorporating a conventional salt of an epoxy-amine adduct, where the adduct has the formula

that is it does not correspond to the two formulae hereinabove mentioned, and is therefore outside the scope of this invention.

The following materials were used in the preparation of the epoxy-amine adduct.

| A | "Epikote" 1007 resin | 2000.0 parts |
|---|---|---|
|  | "Cellosolve" acetate solvent | 500.0 parts |
|  | Xylene | 166.0 parts |
| B | Diethylamine | 23.0 parts |
|  | Methanol | 22.0 parts |
| D | Butyl "Cellosolve" | 430.0 parts |

The method of preparation of the adduct was identical to that of Example 1 except for the omission of one exotherm. The molecular weight of the adduct was 4000. An attempt was made to make a coating composition along the lines of Example 1 but the final blend of millbase, adduct, butylated urea-formaldehyde resin and solvent would not emulsify when the acid was added and the blend stirred into water.

EXAMPLE 4

Illustration of the critical nature of the maximum $pK_b$ value of the terminal amines.

A number of adducts, identical except for the linking and terminal amines were prepared and processed into coating compositions comprising ionizable salts according to the invention according to the methods of Example 1. The degree of final emulsification was assessed and the results were as recorded in the following table.

| Linking Amine | Terminal Amine | $pK_b$ Linking Amine | $pK_b$ Terminal Amine | Degree of Emulsification |
|---|---|---|---|---|
| O-Phenylene diamine | Diethylamine | 9.5 | 3.0 | good |
| Butylamine | " | 3.4 | 3.0 | " |
| Ethylenediamine | " | 4.1 | 3.0 | " |
| Hexamethylene diamine | " | 3.1 | 3.0 | " |
| Ethylene diamine | Dibutylamine | 4.1 | 2.7 | " |
| Ethylene diamine | Diethanolamine | 4.1 | 5.1 | no emulsion |

It can be seen that whereas the $pK_b$ of the linking amine makes no difference to the final achievement of a stable pigmented emulsion, the $pK_b$ of the terminal amine makes a great deal of difference. It is necessary that the $pK_b$ of the terminal amine be lower than 4.

EXAMPLE 5

A number of coating compositions comprising ionisable salts were prepared using a variety of acids for emulsification.

An epoxy-amine adduct was prepared according to the method of and using the material and quantities of Example 1. Portions of this adduct were then processed into coating compositions in the manner of Example 1 except that a number of different acids were used in the final stage prior to emulsification. The emulsification was carried out in the manner of Example 1 and the degree of emulsification assessed and recorded in the following table.

| Acid | $pK_a$ Value | Degree of Emulsification |
|---|---|---|
| Hydrochloric | <1 | nil |
| Sulphuric | <1 | nil |
| Trichloroacetic | 0.7 | nil |
| Oxalic | 1.2 | very poor |
| Phosphoric | 2.1 | good |
| Citric | 3.4 | poor |
| Formic | 3.8 | good |
| Succinic | 4.2 | fair |
| Acetic | 4.7 | good |
| Dimethylol propionic | 4.8 | good |
| O-nitrophenol | 7.2 | nil |
| Boric | 9.2 | nil |

It can be seen that the use of very strong acids and very weak acids results in no emulsification. Acids with a $pK_a$ within the range of 1.5 – 6.0 generally give acceptable results. It may also be seen that carboxylic acids with one carboxyl group such as acetic and formic acids give superior results to those with two or more carboxyl groups such as succinic and citric acids.

EXAMPLE 6

Example 1 was repeated but with the substitution of the phosphoric acid (137 parts) and butyl "Cellosolve" (15 parts) of that example by a solution in water of latic acid (137 parts) and benzaldehyde (15 parts), the amount of water being sufficient to conveniently dissolve the two solutes but not being otherwise critical.

Similar paint films to those of the composition of example 1 according to the invention were obtained on electrodeposition and baking.

EXAMPLE 7

Similar paint films to those prepared according to the invention in example 1 were obtained, when that example was repeated but replacing the phosphoric acid (137 parts) by dimethylolpropionic acid (137 parts).

We claim:

1. A method of depositing a coating composition on an electrically conductive substrate which comprises immersing said article in an aqueous coating composition consisting essentially of a dispersion in water of an ionizable salt of an epoxy-amine adduct and an acid together with a crosslinking agent for the adduct, characterized in that the ionizable salt consists of the combination of an acid and an epoxy-amine adduct selected from the compounds of the formulae $$B_1 - A_1 - C_1 - A_2 - B_2 \quad (a)$$

and $$B_1 - _{A1} - C_1 - A_2 C_2 - A_3 - B_2 \quad (b)$$

wherein
 $A_1$, $A_2$ and $A_3$ are epoxy free residues of essentially straight-chain di-epoxides;
 $B_1$ and $B_2$ and residues of primary or secondary monoamines which have a $pK_b$ value of 4 maximum;
 $C_1$ and $C_2$ are residues of amines having one or two primary amino groups; and further characterized in that:
 (1) the acid shall have a $pK_a$ value of from 1.5–6.0, and if it is a carboxylic acid it shall contain not more than two carboxyl groups;
 (2) at least 40% of the amine groups must be reacted with the acid, to form an amine salt; and
 (3) the epoxy-amine adduct shall have a molecular weight of 1500 – 7000; making said substrate the cathode and passing electrical current between said substrate and a counter-electrode which is in electrical contact with said aqueous coating composition.

2. A method of depositing a coating composition on an electrically conductive surface according to claim 1, characterized in that 50–60% of the amine groups of the epoxy-amine adduct are reacted with the acids to form an amine salt.

3. A method of depositing a coating composition on an electrically conductive surface according to claim 1, characterized in that the cross-linking agent is a butylated urea-formaldehyde resin.

4. A method of depositing a coating composition on an electrically conductive substrate according to claim 1, characterized in that the acid is selected from phosphoric, lactic, dimethylol propionic and acetic acids.

* * * * *